United States Patent [19]
Auld et al.

[11] Patent Number: 6,088,391
[45] Date of Patent: Jul. 11, 2000

[54] METHOD AND APPARATUS FOR SEGMENTING MEMORY TO REDUCE THE MEMORY REQUIRED FOR BIDIRECTIONALLY PREDICTIVE-CODED FRAMES

[75] Inventors: David R. Auld; Raymond H. Lim, both of San Jose, Calif.

[73] Assignee: LSI Logic Corporation, Milpitas, Calif.

[21] Appl. No.: 08/654,321

[22] Filed: May 28, 1996

[51] Int. Cl.[7] ................................................ H04N 7/36
[52] U.S. Cl. ........................ 375/240; 348/415; 348/716
[58] Field of Search .................................. 348/409, 415, 348/416, 714, 716; H04N 7/36

[56] References Cited

U.S. PATENT DOCUMENTS

| | | | |
|---|---|---|---|
| 5,717,461 | 2/1998 | Hoogenboom | 348/416 |
| 5,825,636 | 11/1998 | Auld | 348/714 |

FOREIGN PATENT DOCUMENTS

| | | |
|---|---|---|
| 0 696 874 | 2/1996 | European Pat. Off. . |
| 0 710 028 | 5/1996 | European Pat. Off. . |
| 0 714 208 | 5/1996 | European Pat. Off. . |
| 0 738 084 | 10/1996 | European Pat. Off. . |
| 0 793 391 | 9/1997 | European Pat. Off. . |

OTHER PUBLICATIONS

International Search Report for PCT/US 97/09217 dated Oct. 16, 1997.

*Primary Examiner*—Howard Britton

[57] ABSTRACT

A memory system for B frames of pixel data, where each B frame includes a plurality of sections, and where each of the plurality of sections includes pixel data corresponding to the top and bottom fields of a frame. The memory system includes a memory organized into a plurality of segments for storing the pixel data, where the number of segments equals the number of frame sections plus two additional segments. However, each of the segments is half the size of a frame section. The memory system also includes a segmentation device for receiving and separating pixel data according to the top and bottom fields of each frame. The segmentation device tracks the segments to determine two available segments of said memory, and for each section of each frame, stores pixel data from the top field into one of the available segments and stores pixel data from the bottom field into the other available segment of the memory. A segment pointer table is preferably included for tracking the segments of memory for interlaced display. A decoder system includes the memory and the segmentation device, and also includes a reconstruction unit for receiving and decoding video data into pixel data, and display circuitry for retrieving pixel data from the segments. A method of storing and retrieving pixel data includes steps of separating and storing the pixel data by field into respective segments. After half a framestore, the retrieved by a display device for interlaced display.

26 Claims, 6 Drawing Sheets

| | 302 Reconstruction Sub-sections | 304 Display Sub-sections |
|---|---|---|
| | 0 | 1 |
| | 1 | 3 |
| | 2 | 5 |
| | 3 | 7 |
| | 4 | 0 |
| | 5 | 2 |
| | 6 | 4 |
| | 7 | 6 |

| Iterations → | 0 | | 1 | | 2 | | 3 | | 4 | | 5 | |
|---|---|---|---|---|---|---|---|---|---|---|---|---|
| | R | D | R | D | R | D | R | D | R | D | R | D |
| T0 | 0 | | 4 | 1 | 5 | 0 | 2 | 4 | 1 | 5 | 0 | 2 |
| T1 | 1 | | 0 | 3 | 4 | 3 | 5 | 3 | 2 | 3 | 1 | 3 |
| T2 | 2 | | 1 | 5 | 0 | 2 | 4 | 1 | 5 | 0 | 2 | 4 |
| T3 | 3 | | 3 | 2 | 3 | 1 | 3 | 0 | 3 | 4 | 3 | 5 |
| T4 | 4 | 0 | 5 | 4 | 2 | 5 | 1 | 2 | 0 | 1 | 4 | 0 |
| T5 | 5 | 2 | 2 | 1 | 1 | 0 | 0 | 4 | 4 | 5 | 5 | 2 |
| T6 | 0 | 4 | 4 | 5 | 5 | 2 | 2 | 1 | 1 | 0 | 0 | 4 |
| T7 | 2 | 0 | 1 | 4 | 0 | 5 | 4 | 2 | 5 | 1 | 2 | 0 |

Fig. 3

METHOD AND APPARATUS FOR SEGMENTING MEMORY TO REDUCE THE MEMORY REQUIRED FOR BIDIRECTIONALLY PREDICTIVE-CODED FRAMES

FIELD OF THE INVENTION

The present invention relates to video systems, and more particularly to segmentation of memory for reducing the amount of memory required in a video decoder for decoding and displaying bidirectionally predictive-coded frames.

DESCRIPTION OF THE RELATED ART

A video program signal is converted to a digital format, and then compressed and encoded in accordance with one of several known compression algorithms or methodologies. This compressed digital system signal, or bitstream, which includes a video portion, an audio portion, and other informational portion, is then transmitted to a receiver. Transmission may be over existing television channels, cable television channels, satellite communications channels, and the like. A decoder is then typically employed at the receiver to decompress and decode the received system signal in accordance with the same compression algorithm used to encode the signal. The decoded video information may then be output to a display device, such as a television (TV) monitor.

Video compression and encoding is typically performed by a video encoder. The video encoder normally implements a selected data compression algorithm that conforms to a recognized standard or specification agreed to among the senders and receivers of digital video signals. One such emerging standard developed by the Moving Pictures Experts Group (MPEG), is generally referred to as the MPEG-1 Standard. A newer standard, referred to as MPEG-2, is similar to MPEG-1 but includes extensions to cover a wider range of applications. More particularly, MPEG-2 concerns high-quality coding of possibly interlaced video, including high definition television (HDTV). A wide range of applications, bit rates, resolutions, signal qualities and services are addressed, including all forms of digital storage media, TV broadcasting and communications.

In order to compress a video signal, it is typically necessary to sample the analog data and represent this data with digital values of luminance and color difference. The MPEG standard specifies that a luminance component (Y) of a video signal may be sampled with respect to a color difference signals (Cr, Cb) by a ratio of two-to-one (2:1). That is, for every two samples of the luminance component Y, there is one sub-sample each of the color difference components Cr and Cb. A 2:1 sampling ratio is generally considered acceptable because the human eye is much more sensitive to luminance (brightness) components than to color components. Video sampling typically is performed in both the vertical and horizontal directions.

Once the video signal is sampled, it is typically formatted into a non-interlaced signal that contains all of the picture content. More particularly, the video signal includes a plurality of pictures or frames, where each frame includes a plurality of horizontal span lines for display. An interlaced signal, in contrast, is one that contains only part of the picture content for each complete display scan. In an interlaced signal, each frame is divided into two fields. The two fields are often referred to as the even and odd or the top and bottom fields. Each field spans the length of the frame, but only includes every other scan line. The purpose for such field division is that most TVs today display the video information in interlaced format, by displaying one field first, such as the entire top field, then displaying the entire bottom field.

After a video signal is sampled and formatted, the encoder may process it further by converting it to a different resolution in accordance with the image area to be displayed. In doing so, the encoder must determine how to encode each picture. A picture may be considered as corresponding to a single frame of motion video, or to a frame of movie film. However, different encoding schemes may be employed for each picture. The most prevalent picture coding types are: I-pictures (intra-coded pictures) which are coded without reference to any other pictures and are often referred to as anchor frames; P-pictures (predictive-coded pictures) which are coded using motion-compensated prediction from the past I- or P-reference picture, and may also be considered anchor frames; and B-pictures (bidirectionally predictive-coded pictures) which are coded using motion compensation from a previous and a future I- or P-picture. These picture types will be referred to as I, P or B frames.

A typical coding scheme may employ a mixture of I, P, and B frames. Typically, an I frame may occur every half a second, with two B frames inserted between each pair of I or P frames. I frames provide random access points within the coded sequence of pictures where decoding can begin, but are coded with only a moderate degree of compression. P frames are coded more efficiently using motion compensated prediction from a past I or P frame and are generally used as a reference for further prediction. B frames provide the highest degree of compression but require both past and future reference pictures for motion compensation. B frames are generally not used as references for prediction. The organization of the three picture types in a particular video sequence is very flexible. A fourth picture type is defined by the MPEG standard as a D-picture, or DC-picture, which is provided to allow a simple, but limited quality, Fast-Forward mode.

Once the picture types have been defined, the encoder may estimate motion vectors for each 16 by 16 macroblock in a picture. A macroblock (MB) is the basic coding unit for the MPEG standard. A macroblock consists of a 16-pixel by 16-line portion, or four 8-pixel by 8-line blocks, of luminance components (Y) and several spatially corresponding 8 by 8 blocks of chrominance components Cr and Cb. The number of blocks of chrominance values depends upon which particular format is used. Common color space sampling schemes include 4:4:4 for maximum quality but relatively low compression, 4:2:2 including two Cb chrominance blocks and Cr chrominance blocks, and 4:2:0 including two chrominance blocks. A plurality of such macroblocks form a horizontal slice within a frame, where the slice is the basic processing unit in an MPEG coding scheme. A plurality of such slices form each picture or frame, which is the basic unit of display. As described previously, however, each frame is typically interlaced and displayed as two separate fields.

Motion vectors provide displacement information between a current picture and a previously stored picture. P frames use motion compensation to exploit temporal redundancy, or lack or motion, between picture frames in the video. Apparent motion between sequential pictures is caused by pixels in a previous picture occupying different positions with respect to the pixels in a current macroblock. This displacement between pixels in a previous and a current macroblock is represented by motion vectors encoded in the MPEG bitstream. Typically, the encoder chooses which picture type is to be used for each given frame. Having defined the picture type, the encoder then estimates motion vectors for each macroblock in the picture. Typically in P frames, one vector is employed for each macroblock, and in B frames, one or two vectors are used.

When the encoder processes B frames, it usually re-orders the picture sequence so that a video decoder receiving the digital video signal operates properly. Since B frames are usually coded using motion compensation based on previously sent I or P frames, the B frames can only be decoded after the subsequent anchor pictures (an I or P frame) has been received and decoded. Thus, the sequence of the series of pictures may be re-ordered by the encoder so that the pictures arrive at the decoder in a proper sequence for decoding of the video signal. The decoder may then re-order the pictures in proper sequence for viewing.

As mentioned previously, a macroblock is a 16 by 16 region of video data, corresponding to 16 pixels in the horizontal direction and 16 display lines in the vertical direction. When sampling is performed by the video encoder, every luminance component (Y) of every pixel in the horizontal direction is captured, and every luminance component of every line in the vertical direction is captured. However, only every other Cb and Cr chrominance component is similarly captured. The result is a 16 by 16 block of luminance components and two 8 by 8 blocks each of Cr and Cb components. Each macroblock of video data thus consists of a total of six 8 by 8 blocks (four 8 by 8 luminance blocks, one 8 by 8 Cr block, and one 8 by 8 Cb block). The spatial picture area covered by four 8 by 8 blocks of luminance occupies an area equivalent to the region covered by each of the 8 by 8 chrominance blocks. Since there are half as many chrominance samples needed to cover the same area, they fit into an 8 by 8 block instead of a 16 by 16 block.

For a given macroblock of video data, the encoder is programmed to select a coding mode depending on the picture type, the effectiveness of motion compensation in the particular region of the picture, and the nature of the signal within the block. After the coding method is selected, the encoder performs a motion-compensated prediction of the block contents based on past and/or future reference pictures. The encoder then produces an error signal by subtracting the prediction from the actual data in the current macroblock. The error signal is similarly separated into 8 by 8 blocks (four luminance blocks and two chrominance blocks). A Discrete Cosine Transform (DCT) may then be performed on each block to achieve further compression. The DCT operation converts an 8 by 8 block of pixel values to an 8 by 8 matrix of horizontal and vertical coefficients of spatial frequency. Coefficients representing one or more non-zero horizontal or non-zero vertical spatial frequencies are called AC coefficients. An 8 by 8 block of pixel values can subsequently be reconstructed by a video decoder performing an Inverse Discrete Cosine Transform (IDCT) on the spatial frequency coefficients.

Additional compression is provided through predictive coding since the difference in the average value of neighboring 8 by 8 blocks tends to be relatively small. Predictive coding is a technique employed to improve compression based on the blocks of pixel information previously operated on by an encoder. A prediction of the pixel values for a block yet to be encoded may be performed by the encoder. The difference between the predicted and actual pixel values may then be computed and encoded. The different values represent prediction errors which may later be used by a video decoder to correct the information of a predicted block of pixel values.

In addition to the signal compression that is achieved by the encoding process itself, a substantial degree of intentional signal compression is achieved by a process of selecting a quantization step size, where the quantization intervals or steps are identified by an index. The quantization level of frequency coefficients corresponding to the higher spatial frequencies favors the creation of coefficient values of zero by choosing an appropriate quantization step size in which the human visual perception system is unlikely to notice the loss of a particular spatial frequency unless the coefficient value for that spatial frequency rises above the particular quantization level chosen. The statistical encoding of the expected runs of consecutive zeroed-valued coefficients corresponding to the higher-order coefficients accounts for considerable compression gain.

In order to cluster non-zero coefficients early in the series and to encode as many zero coefficients as possible following the last non-zero coefficient in the ordering. The coefficient sequence is often organized in a specified orientation termed zigzag ordering. Zigzag ordering concentrates the highest spatial frequencies at the end of the series. Once the zigzag ordering has been performed, the encoder typically performs "run-length coding" on the AC coefficients. This process reduces each 8 by 8 block of DCT coefficients to a number of events represented by a non-zero coefficient and the number of preceding zero coefficients. Because the high-frequency coefficients are more likely to be zero, run-length coding results in additional video compression.

The encoder may then include a variable length decoder (VCD) to perform variable-length coding (VLC) on the resulting data. VLC is a reversible procedure for coding data that assigns shorter code words to frequent events and longer code words to less frequent events, thereby achieving additional video compression. Huffman encoding is a particularly well-known form of VLC that reduces the number of bits necessary to represent a data set without losing any information. The final compressed video data is then ready to be transmitted to a storage device or over a transmission medium for reception and decompression by a remotely located decoder. The MPEG standard specifies a particular syntax for a compressed bitstream. The MPEG video syntax comprises six layers, each of which supports either a signal processing function or a system function. The MPEG syntax layers correspond to a hierarchical structure. A "sequence" is the top layer of the video coding hierarchy and consists of a header and some number of "Groups-of frames" (GOPs). The sequence header generally initializes the state of the decoder, which allows the decoder to decode any sequence without being affected by past decoding history. A GOP is a random access point, that is, it is the smallest coding unit that can be independently decoded within a sequence. A GOP typically consists of a header and some number of "pictures." The GOP header contains time and editing information.

As discussed previously, there are at least three types of pictures or frames: I frames, P frames and B frames. Because of the picture dependencies, the order in which the frames are transmitted, stored, or retrieved, is not necessarily the display order, but rather an order required by the decoder to properly decode the pictures in the bitstream. For example, a typical sequence of frames, in display order, might be shown as follows:

| I | B | B | P | B | B | P | B | B | P | B | B | I | B | B | P | B | B | P |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 |

By contrast, the bitstream order corresponding to the given display order would be as follows:

| I | P | B | B | P | B | B | P | B | B | I | B | B | P | B | B | P | B | B |
|---|---|---|---|---|---|---|---|---|---|---|---|---|---|---|---|---|---|---|
| 0 | 3 | 1 | 2 | 6 | 4 | 5 | 9 | 7 | 8 | 12 | 10 | 11 | 15 | 13 | 14 | 18 | 16 | 17 |

Because the B frame depend on a subsequent I or P frame in display order, the I or P frame must be transmitted and decoded before the dependent B frame.

Each of the "picture" portions of a GOP consists of a header and one or more slices. The picture header contains time stamp, picture type, and coding information. A slice consists of an integral number of macroblocks from a picture and can be used by a video decoder to recover from decoding errors. If the bitstream becomes unreadable within a picture, the decoder will normally be able to recover by waiting for the next slice, without having to drop the entire picture. A slice also includes a header that contains position and quantizer scale information. Since blocks are the basic coding unit, the DCT is applied at the block level. Each block typically contains 64 component pixels arranged in an 8 by 8 matrix. The pixel values are not individually coded, but are components of the coded block. A macroblock is the basic unit for motion compensation and quantizer scale changes. As discussed previously, each 4:2:0 macroblock consists of a header and six component 8 by 8 blocks: four blocks of luminance, one block of Cb chrominance, and one block of Cr chrominance. The macroblock header contains quantizer scale and motion compensation information.

The video decoding process is generally the inverse of the video encoding process and is employed to reconstruct a motion picture sequence from a compressed and encoded bitstream. The data in the bitstream is decoded according to a syntax that is itself defined by the data compression algorithm. The decoder must first identify the beginning of a coded picture, identify the type of picture, then decode each individual macroblock within a particular picture. If there are motion vectors and macroblock types (each of the frame types I, P, and B have their own macroblock types) present in the bitstream, they can be used to construct a prediction of the current macroblock based on past and future reference frames that the decoder has already stored. Coefficient data is then inverse quantized and operated on by an IDCT process so as to transform the macroblock data from the frequency domain to data in the time and space domain.

After all of the macroblocks have been processed by the decoder, the picture reconstruction is complete. If a reconstructed frame is a reference or anchor frame, such as an I or a P frame, it replaces the oldest stored anchor frame and is used as the new anchor for subsequent frames. As noted above, the frames may also need to be re-ordered before they are displayed in accordance with their display order instead of their coding order. After the frames are re-ordered, they may then be displayed on an appropriate display device.

In general, encoded video data is received and stored in a rate or channel buffer. The data is then retrieved from the channel buffer by a decoder or reconstruction device for performing the decoding process, as described previously, and the decoded data is stored into a picture store buffer. In some configurations, the channel and picture buffers are incorporated into a single integrated memory buffer. The decoded data is in the form of I, P or B frames, where a display controller retrieves the picture data for display by an appropriate display device, such as a TV monitor or the like. It is noted that prior to a system according to the present invention, the picture buffer had to be capable of storing at least three frames of video information. Two frames of storage was necessary for storing two anchor frames. The two anchor frames were then used to reconstruct a B frame into the third frame storage area.

In particular, to reconstruct a B frame, its two related anchor frames must be decoded and available in the picture buffer. This is true since the B frame is interpolated using both anchor frames during the reconstruction process. Because macroblocks include information for both even and odd fields for each frame, reconstruction of each B frame is performed progressively, or in a non-interlaced order. However, display of each frame is in an interlaced order, where an entire first field is displayed first before beginning the second field. Thus, B frame reconstruction must lead the display of the B frame by at least half a frame, and the reconstruction process had to be completed to finish the display of the entire B frame. Due to the progressive versus interlaced order between reconstruction and display, an entire frame had to be available in prior art systems to complete reconstruction of each B frame for display. Thus, prior art systems had to include at least three frame stores of memory.

The present disclosure primarily concerns MPEG-2 decoders compliant with International Standards Organization/International Electro-technical Commission (ISO/IEC) 2-13818 for supporting NTSC (National Television Systems Committee) or PAL (Phase Alternating Line) standards. The NTSC resolution is 720×480 picture elements (pixels) and the PAL resolution is 720×576 pixels per frame. The picture rate is 24 to 30 frames per second. At a sampling rate of 4:2:0, each frame requires an average of 12 bits per pixel. For memory devices, such as a dynamic random access memory (DRAM), each PAL type frame requires 4,976,640 bits of storage and each NTSC frame requires 4,147,200 bits of storage. The NTSC standard is primarily for use in the United States (U.S.), whereas the PAL standard is primarily for use in Europe. Since a minimum of three frames of storage were required, a PAL system would require at least 3×4,976,640=14,929,920 bits (14.9 Mb) of memory. An NTSC system would require at least 3×4,147,200=12,441,600 bits (12.5 Mb) of memory. Furthermore, additional memory was required for the channel buffer, as well as overhead storage area for is performing a variety of miscellaneous overhead functions, where such overhead memory was either distributed in the decoder system or incorporated into the integrated memory.

The amount of memory is a major cost item in the production of such decoders. Thus, it is desired to reduce the memory requirements of the decoder system as much as possible to reduce its size and cost. Since practical memory devices are implemented using particular convenient discrete sizes, it is important to stay within a particular size if possible for commercial reasons. For example, it is desired to keep the memory requirements below a particular size of memory, such as 16 Mb, since otherwise a memory device of 24 or 32 Mb would have to be used resulting in greater cost and a waste of extraneous storage area. Although it is possible to implement an NTSC decoder including three full frames of storage within a 16 Mb DRAM memory device, it is still desirable to reduce the memory requirements for NTSC decoders. However, due to the size of each frame, more than 16 Mb would be required to implement a PAL decoder including three full framestores, the channel buffer and miscellaneous functions.

SUMMARY OF THE INVENTION

A memory system according to the present invention enables a decoder system to efficiently decode and display bidirectionally predictive-coded (B) frames of pixel data. Each B frame includes a plurality of sections, where each of the plurality of sections includes pixel data corresponding to the first and second, or top and bottom, respectively, fields of a frame. The memory system includes a memory organized into a plurality of segments for storing the pixel data, where the number of segments equals the number of frame sections plus two additional segments. However, each of the segments is half the size of a frame section. The memory system also includes a segmentation device for receiving and separating pixel data according to the first and second fields of each frame. The segmentation device tracks the segments to determine two available segments of said memory, and for each section of each frame, the segmentation device stores pixel data from the first field into one of the available segments and stores pixel data from the second field into the other available segment of the memory. Since each segment is half the size of the frame sections, the total memory required for the B frames is over half, but less than a full framestore of memory. This results in considerable savings of memory.

The amount of memory required depends upon the amount of segmentation of the memory, where a larger number of segments results in smaller segments and less total memory required. However, since a slice or macroblock row is generally the basic processing unit in an MPEG coding scheme, the minimum segment size is one-half of the amount of memory required for a slice of pixel data. Each macroblock generally corresponds to a 16 pixel by 16 line portion of the frame. For system processing PAL type frames having 720 pixels by 576 lines, the memory needed is 38 segments, where each segment includes enough memory for storing 720 pixels by 8 lines of pixel data. Assuming a standard sampling of 4:2:0 resulting in an average of 12 bits per pixel, the total memory size for B frames is 2,626,560 megabits (Mb), which is approximately 0.528 times a full framestore of 4,976,640 bits. For a decoder system including memory for two anchor framestores plus memory for miscellaneous overhead functions, the total memory is kept within 16 Mb. The maximum segment size is one-eighth of a frame, where six segments are used resulting in a total memory size of 0.75 times a framestore for B frames. In the preferred embodiment, the memory is implemented using DRAMs or the like.

A segment pointer table is preferably included, where the segmentation device maintains the segment pointer table to track the segments of memory for display. In particular, the segmentation device maintains a list of pointers to the segments in the memory, where the resulting order of segments corresponds to the order of display. For example, the pointers to the segments containing the top field data may be listed in order in the upper portion of the table, whereas the pointers to the segments containing the bottom field data are listed in order in the lower portion of the table. Alternatively, the table may include a top and a bottom portion. In either case, for each section of the frame being reconstructed, the segmentation device stores the pointers to the two segments being accessed in the next location of the top and bottom portions of the table, respectively. During display, a display device accessed the pointers in order from the top portion, and then in order from the bottom portion, so that the segments are displayed in an interlaced fashion.

A decoder system according to the present invention for decoding and displaying B frames of pixel data includes the memory and the segmentation device, and also includes a reconstruction unit for receiving and for decoding encoded video data into pixel data, and display circuitry for retrieving pixel data from the segments. The memory includes two framestores for two anchor frames. The reconstruction unit further includes merge and store circuitry for merging two anchor frames for decoding each B frame. The total memory size, even for the two anchor frames, a channel buffer and miscellaneous overhead memory, is still within 16 Mb. The display device begins retrieving segments for display approximately after one-half a B frame is reconstructed into the segmented memory. In particular, reconstruction continues into the two extra segments while the display device retrieves the two segments corresponding to the top of the first field. Since reconstruction and display occur a tab out the same rate per frame section, reconstruction of the next frame section occurs into the two segments freed up by the display device. In this manner, reconstruction and display occur simultaneously, where the display device frees up two segments for the next reconstruction process, until display of the B frame is completed.

A method of storing and retrieving pixel data for B according to the present invention includes the steps of separating the pixel data according to top and bottom fields of the frame in a progressive order, while storing top field pixel data into one segment and storing bottom field data into another segment until the two segments are full. This is repeated until all of the segments are full. While storing into the last two available segments, the top field pixel data from the first two segments storing top field pixel data is retrieved thereby freeing those segments. These segments are preferably retrieved by a display device for display. All of the segments containing top field pixel data is retrieved first, and then all of the segments containing bottom field pixel data are retrieved according to an interlaced display order for each B frame. The two segments freed by each iteration of retrieval are then used for the next reconstruction step.

BRIEF DESCRIPTION OF THE DRAWINGS

A better understanding of the present invention can be obtained when the following detailed description of the preferred embodiment is considered in conjunction with the following drawings, in which:

FIG. 3 is a tabular diagram illustrating segmentation of memory according to the present invention;

DETAILED DESCRIPTION OF THE PREFERRED EMBODIMENT

Figure 1:
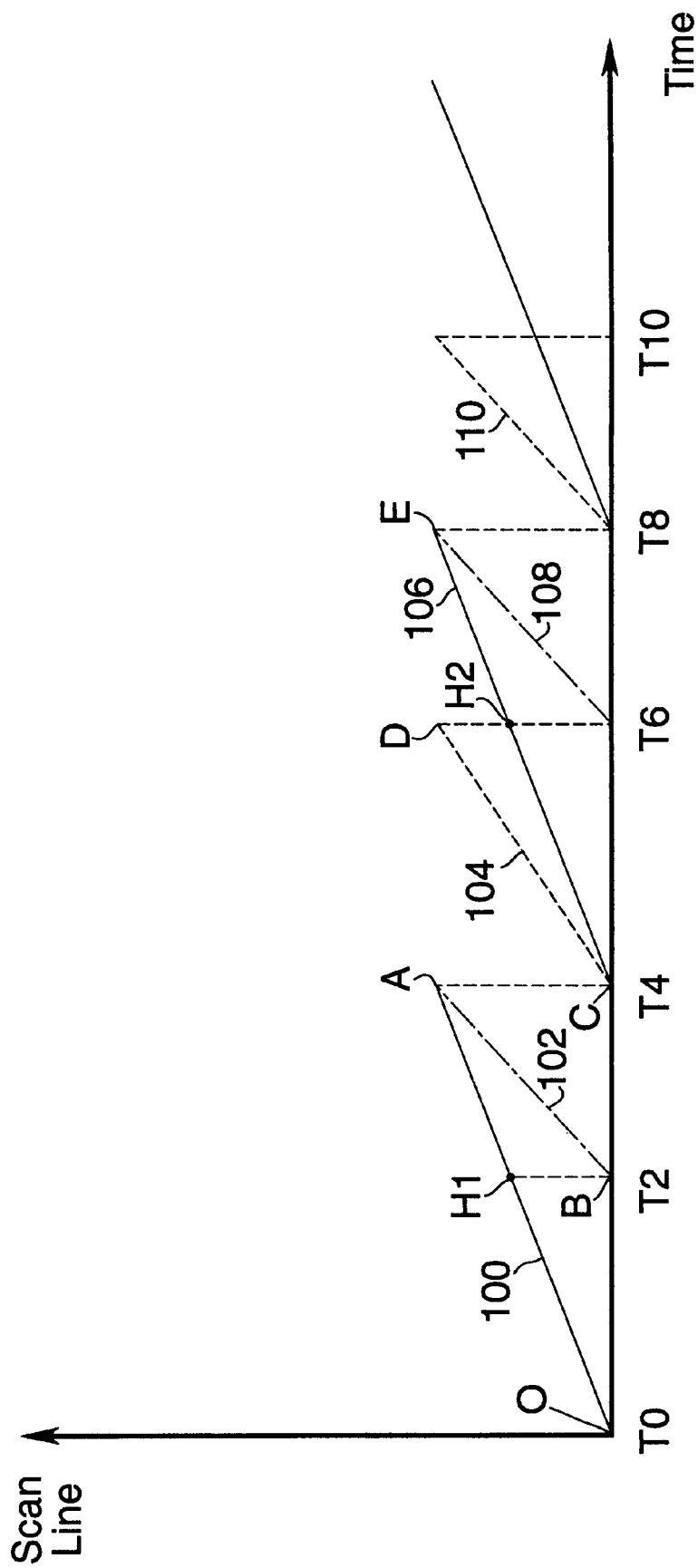
FIG. 1 is a graph illustrating operation of a decoder system according to prior art.

FIG. 1 is a graph illustrating operation of a decoder system operating according to prior art. Each of the scan lines forming a B frame are referenced along the y-axis and time is plotted along the x-axis of the graph. Between times T0 and T4, a first B frame, referred to as FR0, is reconstructed as illustrated with a solid line 100 plotted between the origin (O) and a point A of the graph. Such reconstruction occurs in a progressive manner, where each macroblock for each slice is reconstructed one at a time into a picture buffer (not shown). Each macroblock includes data for a contiguous 16-pixel by 16-line portion of the frame. Thus, each macroblock incorporates data for both fields, where the consecutive lines of data are stored at consecutive locations within the picture buffer. For both NTSC and PAL type decoders, 45 such macroblocks are reconstructed for each slice having a width of 720 pixels. For NTSC systems including 480 total scan lines, 30 slices are reconstructed for each frame for a total of 1,350 macroblocks per frame. For PAL systems including 576 total scan lines, 36 slices are reconstructed for each frame for a total of 1,620 macroblocks per frame. It is noted that PAL systems display 25 frames per second whereas NTSC systems display 30 frames per second, so that each system reconstructs and displays about 40,500 macroblocks per second on the average.

At time T2, after reconstruction of approximately half of the first frame FR0 is completed as indicated by a point H1, a display device (not shown) begins retrieving and displaying the first field of the first frame FR0, referred to as FR0-FD0. A dash-dot line 102 plotted between points B and A illustrates display of the first field FR0-FD0 of the first frame FR0, where such display completes at approximately time T4. On the average, reconstruction and display of each pixel occurs at roughly the same rate. However, reconstruction of each frame occurs progressively, line by line, whereas display occurs in an interlaced manner, or every other line corresponding to a field. Thus, the effective rate of display of each slice of scan lines is twice as fast as reconstruction for each macroblock row of pixel data. Since the display of the first field FR0-FD0 of the frame FR0 takes half the time as reconstruction of the entire frame FR0, the slope of the line 100 is about half that of the slope of line 102. However, only half of the frame FR0 has been displayed at time T4. Furthermore, it is noted that reconstruction of the last several lines of the last slice of the frame FR0 corresponding to the field FR0-FD0 is completed just prior to those same lines being displayed. In this manner, reconstruction and display are substantially locked together.

Beginning approximately at time T4, the display device begins retrieving and displaying the second field of the first frame FR0, referred to as field FR0-FD1. This is illustrated with a dashed line 104 plotted between points C and D, where display of the second field FR0-FD1 of the first frame FR0 is completed at approximately time T6. Also between times T4 and T8, reconstruction of a second frame FR1 occurs, as illustrated by a solid line 106 plotted between points C and E. Since a single framestore of memory is used, such reconstruction of the second frame FR1 overwrites the data for the first frame FR0. Thus, the displaying of the second field FR0-FD1 of the first frame FR0 must begin slightly before reconstruction begins of the second frame FR1, since otherwise the data for the second field FR0-FD1 would be overwritten by data for the second frame FR1. Such delay is relatively short, however, and could be the delay associated with a single macroblock of data. Since the display of the second field FR0-FD1 of the first frame FR0 occurs at twice the effective rate of reconstruction of the second frame FR1, such display and reconstruction proceeds concurrently between times T4 and T6 without interfering with each other.

At time T6, display of the second field FR0-FD1 of the first frame FR0 completes while reconstruction of the second FR1 is approximately half completed, as illustrated at point H2. Thus, at time T6, the entire first frame FR0 has been displayed, while half of the second frame FR1 has been reconstructed. Between times T6 and T8, display of the first field FR1-FD0 of the second frame FR1 is performed, as illustrated by a dash-dot line 108 between points F and E. Thus at time T8, reconstruction of the entire second frame FR1 and display of the first field FR1-FD0 of the second frame FR1 is completed. Display of the second field FR1-FD1 of the second frame FR1 begins at time T8 and ends at time T10, as illustrated by a dashed line 110. Reconstruction and display of a third and subsequent frames proceeds in a similar manner beginning at time T8.

A review of FIG. 1 reveals that one framestore of memory is sufficient for reconstructing and displaying B frames. First, since the display rate effectively occurs at twice the rate of reconstruction, display can begin on a field when reconstruction of the frame is only halfway completed, as long as such display and reconstruction complete at about the same time. Second, reconstruction of new data can begin in an area of memory almost at the same time as display of data in that same area of memory, Furthermore, it is conceivable that less memory could be used for B frames, since after data in a memory area is displayed, that memory area is available for reconstruction. For practical reasons, however, this has not been achieved in prior art systems. Reconstruction occurs progressively on macroblocks of data at a time, while display is interlaced and is performed in raster scan format. Thus, reconstruction of a subsequent frame in the same area of memory would destroy data in the second field of the present frame. Attempting to reconstruct into every other line of memory is not feasible with practical dynamic random access memories (DRAMs) typically used to implement the memory. Such non-standard addressing would substantially decrease DRAM page hit rates, which would cause delays resulting in inefficient use of the DRAMs. This, in turn, would slow the reconstruction process too much compared to the display rate. Furthermore, such addressing would result in substantial fragmentation of the memory. A very complicated addressing scheme would be necessary to determine where the data to be displayed resides.

It is also conceivable to use half the amount of memory for B frames by reconstructing the data twice as fast. However, although the reconstruction process may be sped up by a certain amount, practical decoding systems are not presently capable of reconstructing at twice the present rate. Furthermore, even if double-speed reconstruction were possible, it would be required to store the data at twice the present rate. Present DRAM devices and similar practical memory devices, however, are not capable of such storage speeds. Thus, reconstruction and display rates are effectively locked together, so that an entire frame of memory was required to reconstruct and display B frames.

A decoder system according to the present invention overcomes these problems and allows a reduction in the amount of memory for decoding and displaying B frames. Since B frames are generally not used to predict other frames, the B frame data is used only for display and thus pixel data is no longer needed once it has been displayed. The frame size of the display is conceptually divided into a plurality of equivalent-sized sections. The corresponding memory for storing frames is divided into the same number of segments where each segment is half the size of a section for storing data associated with either one or the other field in a section. Thus, each segment includes only enough memory for storing half the number of lines of a section. Thus, only half of the scan line data of each section corresponding to one field or the other is stored in a given segment. It is noted that the term "section" refers to the frames or corresponding display area, while the term "segment" refers to the memory for storing the frame data.

The preferred minimum size of a segment is half of a slice, where a slice is an entire macroblock row of a frame. However, each segment may be larger and include data from several consecutive slices, though a smaller number of segments would be required. The maximum size of each segment depends upon the size of the frame, but is preferably no larger than one-eighth the size of a frame. The memory for storing B frames includes the total number of segments, plus two additional segments. The additional two segments allow simultaneous reconstruction of one portion of the frame while displaying pixel data associated with a different portion of the frame. This prevents stalls in reconstruction, where such stalls would result in the display process catching up with reconstruction before the frame is completed.

As an example, the total display size of a PAL type frame includes 720 by 576 pixels, which corresponds to 36 slices, each slice including 45, 16-pixel by 16-line macroblocks. The display is thus divided into 36 sections, each section corresponding to a slice of the frame. Each section, however, includes data for both fields of the frame. Thus, the memory for frame store includes 36+2=38 equal segments, where each segment includes enough storage for half of each section or slice. For 4:2:0 sampling, where each pixel includes, on the average, 12 bits, each of the 38 segments includes 720 pixels×8 lines×12 bits per pixel=69,120 bits. The frame store for the B frame thus includes 38×69,120= 2,626,560 bits rather then the typical frame store size of 4,976,640 bits, for a savings of 2,350,080 bits of storage. Thus, the amount of memory for storing and displaying a B frame using the present invention is only approximately 0.528 times the size of the framestore required for prior art systems. It is noted that larger segments may be used, although less memory savings result. For example, a PAL frame may be divided into four sections, corresponding to 4+2=6 memory segments, where each segment includes 720×72 lines=51,840 pixels or 622,080 bits. The total memory required would be 622,080 bits×6 segments=3,732, 480 bits, rather than the typical 4,976,640 bits. This results in a savings of 1,244,160 bits, where the new frame store is 3,732,480÷4,976,640=0.75 times or ¾ the size of the frame store of prior art.

During the reconstruction process, the data from each macroblock is separated into two separate fields and stored into two different segments in the memory. Thus, each consecutive line in each segment corresponds to consecutive lines of one field. The data within each segment of memory is displayed line by line until the entire segment is displayed. The entire memory segment is then available for reconstruction. Since each segment includes a plurality of scan lines stored consecutively and displayed consecutively, the DRAMs typically used to implement the memory are addressed in a standard manner. Therefore, segmentation of the memory according to the present invention allows the DRAM page hit rate to be maintained at the same level, so that storage and retrieval of data from the memory is not slowed. Furthermore, such segmentation of the memory keeps the data organized and prevents undesirable fragmentation of the memory. A system for separating, storing and retrieving the data for display may be implemented in a straightforward manner. It is appreciated that a memory system for segmenting the memory according to the present invention enables reconstruction and display of B frames using less than an entire frame of storage. Thus, over 2.5 but less than three framestores are necessary. In the preferred embodiment, just over 2.5 framestores, or less than 2.53 framestores, are necessary for 38 segments for a PAL system.

It is noted that a decoder system according to the present invention over-writes B frame data soon after being displayed, so that the decoder system generally cannot repeat field operations in B frames. Thus, the decoder system cannot implement freeze frame. The decoder system can implement freeze field or slow motion by displaying only the fully reconstructed second or bottom field in a frame, instead of both fields. It is further noted that the present application is generally not applicable to implementations requiring 3:2 pulldown for conversion of movie frame rate of 24 frames per second to a frame rate of 30 frames per second. Thus, the present invention is applicable to PAL formats, but only NTSC formats not requiring 3:2 pulldown capability.

A decoder system according to the present invention may be implemented in any type of application including video capability, where the present invention is not limited by the particular application. For example, the decoder system could be incorporated into digital video disk (DVD) applications, entertainment systems, communications systems, global positioning systems (GPS), etc. The decoder system may be implemented in any one or more of a plurality of system types, such as a set top box, a personal computer (PC) or any larger computer system, such as workstations, servers, minicomputers, main frame computers, super computers, etc. The system may include single chip modules (SCM), multi-chip modules (MCM), board level products, box level products, etc.

A decoder system according to the present invention is preferably incorporated into an MPEG-2 type system. However, the present invention is also applicable to other decoder types, such as MPEG-1, Wavelet, H.261, H.320, JPEG, etc. The present invention is preferred for PAL type display formats, although other display formats are contemplated, such as NTSC, red, green, blue (RGB) formats, etc. The present invention may be used with any type of display device, such as a TV, monitor, liquid crystal display (LCD), plasma screen, visual projection device, virtual reality display, etc. The present invention includes a memory device, which is typically implemented using a dynamic random access memory (DRAM) for cost considerations. However, other memory types may be used, such as static RAM (SRAM), video RAM (VRAM), or other types of RAM systems with adequate performance.

Figure 2A:
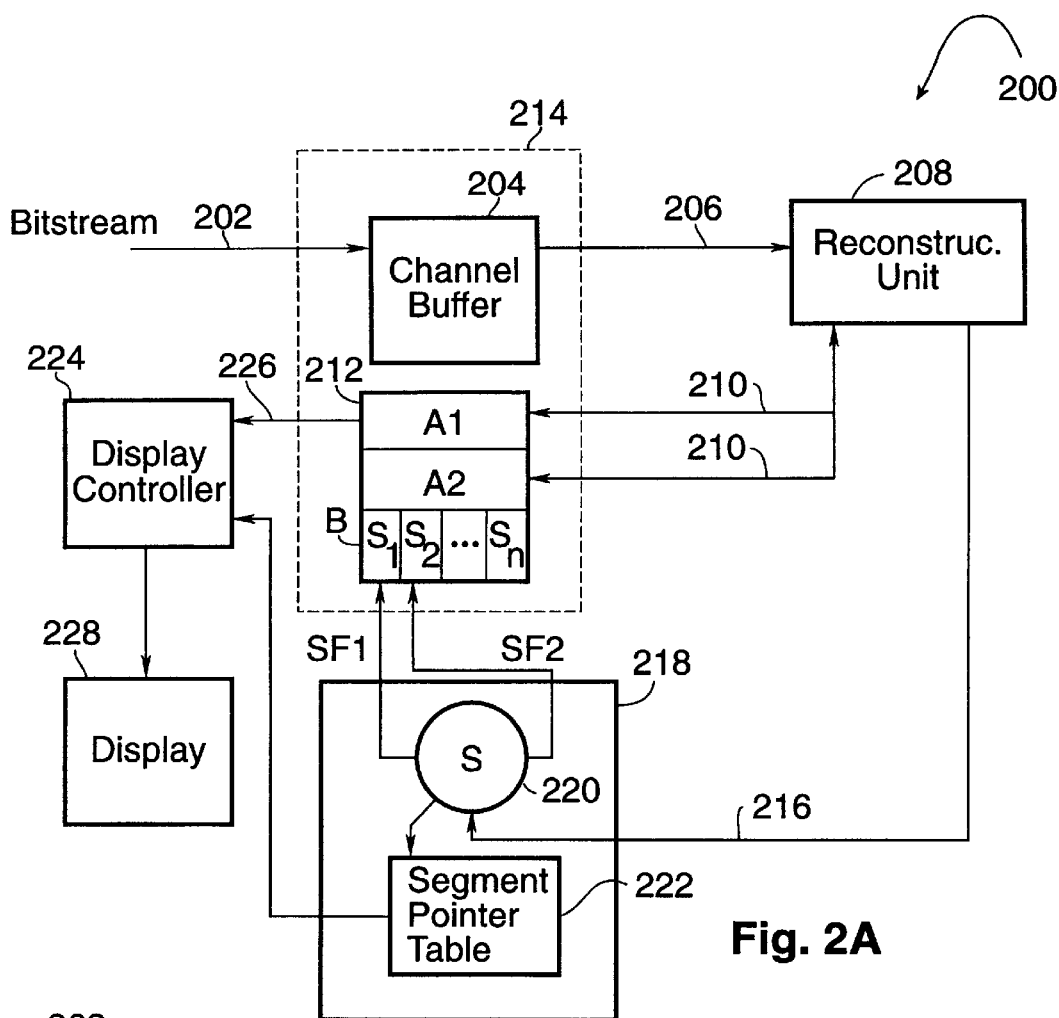
FIG. 2A is a simplified block diagram illustrating a decoder system according to the present invention.

Referring now to FIG. 2A, a simplified block diagram is shown of a decoder system 200 according to the present invention. The decoder system 200 shown in FIG. 2A primarily illustrates data flow and organization. Encoded video data in the form of a bitstream is provided to a rate or channel buffer 204 on a data channel 202 for temporary storage. The encoded video data typically includes picture information that is representative of a plurality of single frames of motion video. Each encoded frame or picture of motion video is represented in digital form as a sequence of bits. The structure of this sequence preferably conforms to a selected video compression standard, such as the MPEG-1 or MPEG-2 standards, for example. The video data within the channel buffer 204 is provided on another channel 206 to a reconstruction unit 208, which decodes the picture data to a form appropriate for display.

The reconstruction unit 208 preferably incorporates decoder functions for translating the encoded video data into corresponding symbols and/or events, where these symbols or events are then reconstructed into the original frames. For example, the reconstruction unit 208 may include an IDCT pipeline, a motion compensation (MC) pipeline and a merge and store unit for executing the reconstruction process. The IDCT pipeline coordinates the reconstruction of each macroblock of a frame, and the MC pipeline processes any motion compensation information with respect to each macroblock.

The reconstructed frame data from the reconstruction unit 208 is then provided to a picture buffer 212 across a data channel 210. The picture buffer 212 preferably includes enough memory for two full anchor frames, referred to as A1 and A2, where the anchor frames are either I or P frames according to the MPEG standard. The data channel 210 is bidirectional and enables the reconstruction unit 208 to retrieve data from either anchor frame A1 or A2 in the picture buffer 212. For example, the anchor frame A1 may store an I frame previously reconstructed by the reconstruction unit 208. The reconstruction unit 208 may retrieve the I frame and merge data from the channel buffer 204 for reconstruction of a P frame. The P frame may then be stored in the picture buffer 212 as the anchor frame A2.

The picture buffer 212 also includes memory for storage of data for a B frame. As in prior art systems, the anchor frames A1 and A2 are retrieved by the reconstruction unit 208, for reconstructing a B frame, so that the anchor frames A1 and A2 must be fully available in decoded form. However, in prior art systems, the memory size required in the picture buffer for the B frame was the same size as the anchor frames A1 and A2. Thus, a picture buffer previously had to include enough memory for three full framestores, including the two anchor frames A1 and A2 and a full B frame. In the picture buffer 212, however, the B frame is segmented into a plurality of segments S1, S2, . . . Sn, where the total memory required to store and display the B frame is less than a full framestore worth of memory. As described further below, after each segment S1–Sn of the B frame is displayed, that segment is freed up for reconstructed data. This is achieved without affecting the page hit rate of the DRAMs typically used to implement the picture buffer 212, and without affecting the display of the B frame. Depending upon the amount of segmentation, the memory required in the picture buffer 212 for the B frame may be just a little over half the size of a full framestore. Such reduction of the amount of memory required for storing the B frame results in cost savings of the overall decoding system 200. In the preferred embodiment, the channel buffer 204, the picture buffer 212 as well as any other memory required for functions performed are incorporated into a single memory device 214 having a maximum size of 16 Mb. This results in significant cost reduction of the memory device 214. According to the present invention, the reconstruction unit 208 provides B frame data on a data channel 216 to a segmentor 220 of a segmentation unit 218, where the segmentor 220 divides the data into top and bottom fields SF1 and SF2. The top and bottom field data is then written to the B frame portion of the picture buffer 212. In particular, top field data SF1 is provided into a first segment, such as segment S1, while bottom field data SF2 is provided to a second segment, such as segment S2. When these segments S1 and S2 are full, the segmentor 220 chooses two more free segments and provides the segmented data to two more segments, such as segments S3 and S4. It is not necessary that the segments be written to in any particular order. Thus, for example, the segmentor 220 may write top field data into a segment S5 while writing bottom field data into a segment S7, or even into a segment S1. Preferably, the segmentor 220 also maintains a segment pointer table 222 for keeping track of the order of the segments S1–Sn, where the order of the segments in the segment pointer table 222 is preferably in display order.

The size of each of the segments S1–Sn depends upon how many segments there are. As described previously, the B frame is conceptually divided into a number of equal-sized sections, where each section includes a least one full slice or macroblock row. For example, a PAL frame has 36 slices may include up to 36 sections. A segment is provided for each segment, where each segment includes storage for half of a section corresponding to one field or the other. Two additional segments are provided to enable display during reconstruction. For example, a segment corresponding to a video slice of 720 pixels by 16 lines, where every other line corresponds to one field or the other, respectively, would include enough storage for 720 pixels by 8 lines. Assuming an average of 12 bits per pixel, the segment would include 69,120 bits. Thus, a PAL frame having 36 slices, for example, would include 38 slices for a total of 2,626,560 bits. Of course, the frame could be divided into less segments, although less memory savings would result. For example, a PAL frame could be divided into four 720-pixel by 144-line sections, resulting in six 720-pixel by 72-line segments. The memory in the picture buffer 212 for the B frame would then have six 622,080-bit segments for a total of 3,732,480 bits.

A display controller 224 retrieves data of a frame stored in the picture buffer 212 across a data channel 226 and provides the data in the appropriate form for display on a display device 228. The display device 228 is preferably a monitor, a TV, or any comparable display device. The display controller 224 and display device 228 displays the information in interlaced format. This is performed in a standard manner for the anchor frames A1 and A2. For B frames, however, the display controller 224 retrieves data from each of the segments S1–Sn one at a time. The display controller 224 preferably accesses the segment pointer table 222 within the segmentation unit 218 to determine which of the segments S1–Sn to display at any given time. As will become more evident, the pointers to the segments S1–Sn are not necessarily listed in numerical order in the segment pointer table 222. However, the segment pointers are preferably retrieved from the table 222 in sequential order. Also, each of the segments are used and accessed more than once. The reason for this is that reconstruction of the B frame is occurring during display, so that segments are reused after being displayed.

Figure 2B:
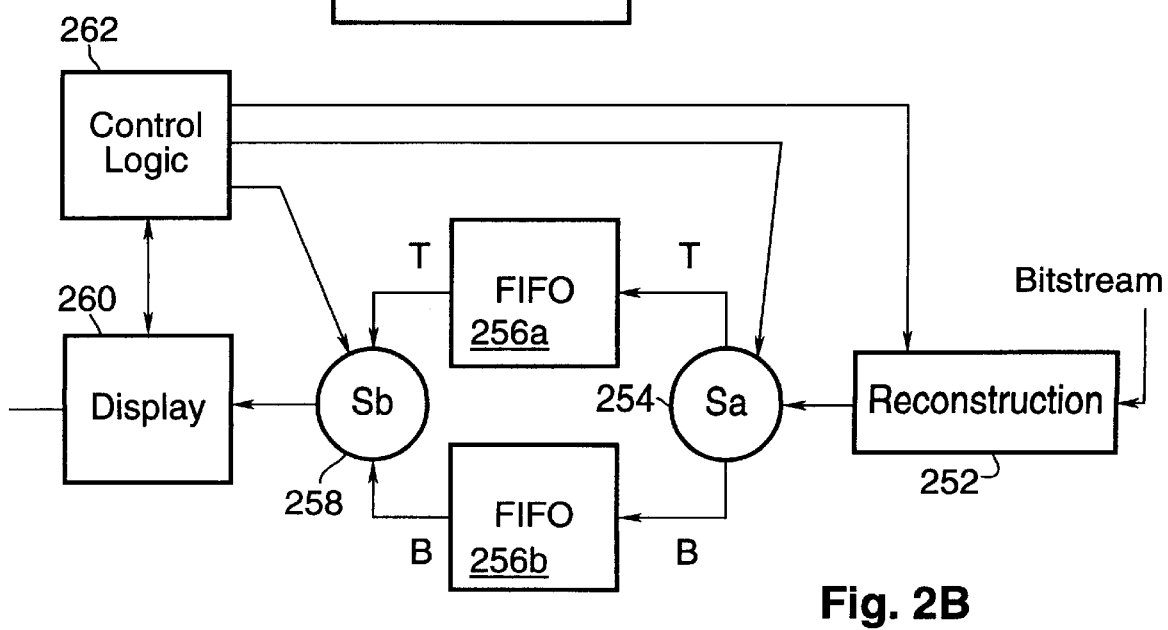
FIG. 2B is a simplified block diagram illustrating a display system for organizing display data.

FIG. 2B is a simplified block diagram illustrating a display system 250 for organizing data for display. A reconstruction unit 252 receives a bitstream of video data and progressively reconstructs sections of B frames into pixel data. The reconstructed data is provided to a segment switch 254, which separates the reconstructed data into top and bottom portions corresponding to top and bottom fields, respectively, of the B frame. Data belonging to the top field is provided to a first-in, first-out (FIFO) memory device 256a, and data belonging to the bottom field is provided to another FIFO 256b. The data is preferably divided into segments, as described previously, where top field segments are stored in the FIFO 256a and bottom field segments are stored in the FIFO 256b. The segment switch 254 alternates the data between the FIFOs 256a and 256b on a line to line basis for separating top and bottom fields. A display switch 258 retrieves data from the segments stored in the FIFOs 256a and 256b for display on a display device 260. The display switch 258 alternates between the FIFOs 256a and 256b, but on a field to field basis. In particular, the display switch 258 retrieves the entire top field from the FIFO 256a, segment by segment, and then switches to the FIFO 256b for retrieving the corresponding bottom field. After an entire frame is displayed, the display switch 258 switches back to the FIFO 256a for the top field of the next frame. Control logic 262 is preferably provided and coupled to the reconstruction unit 252, the segment switch 254, the display switch 258 and the display device 260 for controlling operation.

Referring now to FIG. 3, a tabular diagram is shown illustrating segmentation of memory according to the present invention. FIG. 3 illustrates an implementation where each frame is divided into four sections resulting in six different segments. The particular size of each segment and the relative amount of memory savings depends upon the size of the particular frame type, such as PAL or NTSC, etc. The relative memory savings is the same regardless of the frame type, but does depend upon the number of segments. In particular, since each frame includes four sections, where each section is twice the size of each of the memory segments, a prior art system would require eight segments of memory. An embodiment according to the present invention as illustrated in FIG. 3 requires only six segments, resulting in (8–6)/8×100%=25% memory savings, so that only 75% of a full frame of storage is required. Each section further includes two sub-sections corresponding to the two fields to be displayed. Thus, eight sub-sections are defined, each preferably being the same size as each of the segments of memory.

In FIG. 3, six consecutive main columns numbered #0–#5 are shown in a primary segment table 300, where the segment pattern in the last main column #5 is similar to the first main column #0, since the pattern essentially repeats after five iterations. These columns are referred to as the iterations #0–#5. Within each iteration column is two sub-columns labeled "R" for reconstruction and "D" for display. Each of the sub-columns of each of the iterations #0–#5 includes a plurality of rectangular boxes, each corresponding to a segment of B frame memory. The number within each of the segment boxes denotes the particular segment being accessed, whether being written to, during reconstruction, or read from, during display. Since the reconstruction process leads display by one field, where a field is four segments in size, the first four segments of display in the first iteration #0 are blank since no segments of the B frame are being displayed at that time. Each iteration corresponds to an entire frame, where a first frame #0 is reconstructed in iteration #0, a second frame #1 is reconstructed in iteration #1, and so on. The first field of frame #0 is displayed in the second half of iteration #0, and the second field of frame #0 is displayed in the first half of iteration #1. Time elapses from top to bottom for each iteration, and then from one iteration to the next. Time increments T0–T8 are indicated on the left of the segment table 300, where each time increment represents the relative time associated with each segment.

At the right of the table segment table 300, a reconstruction sub-section column 302 is shown, where each of the numerical entries #0–#7 denotes the particular sub-section of each frame being reconstructed. Each of the sub-sections #0–#7 corresponds to the horizontally aligned segment boxes in the segment table 300. For example, sub-section #0 of frame #0 is reconstructed into segment #0 during the first iteration #0, and sub-section #0 of frame #1 is reconstructed into segment #4 during the second iteration #1. A display sub-section column 304 is shown at the right of the reconstruction sub-section 302, where each of the numerical entries #0–#7 indicates the particular sub-section of a frame being displayed. Again, each of the sub-sections #0–#7 corresponds to the horizontally aligned segment boxes in the segment table 300. Since the display is delayed by one field and since display is performed in an interlaced fashion, the odd numbers #1, #3, #5 and #7 corresponding to the second or bottom field of each frame are listed in order first, followed by the even numbers #0, #2, #4 and #6 corresponding to the first or top field of each frame. For example, sub-section #1 of frame #0 is displayed from segment #1 in the second iteration #1, and sub-section #0 of frame #1 is displayed from segment #4 in the second iteration #1.

The reconstruction process writes into two segments at a time, while display occurs from one segment at a time, in raster scan order. Thus, between times T0 and T2, of the first iteration #0, data from reconstruction of the first section of frame #0, including sub-sections #0 and #1 for the first and second fields, respectively, is written into segments #0 and #1 respectively. It is noted that reconstruction occurs simultaneously into two segments at a time. Thus, halfway through the reconstruction of sub-sections #0 and #1 into segments #0 and #1, respectively, as represented at time T1, segments #0 and #1 are both half-way completed, rather than segment #0 being completed and #1 just being started. However, display occurs one segment at a time. Between times T2 and T4, sub-sections #2 and #3 of the first frame #0 are reconstructed into segments #2 and #3, respectively. Thus, at time T4, half of the first frame #0 has been written into segments #0–#3.

From time T4 to T6 during iteration #0, reconstruction of the next two sub-sections #4 and #5 of frame #0 are written into memory segments #4 and #5, respectively. At time T6, all six segments have been written to. Meanwhile, between times T4 and T5, sub-section #0 stored in segment #0 is displayed, and between times T5 and T6, sub-section #2 stored in segment #2 is displayed. Thus, at time T6, memory segments #0 and #2 are freed and available for storing more reconstruction data. Since segments #0 and #2 are freed, the last two sub-sections #6 and #7 of the first frame #0 are reconstructed into segments #0 and #2, respectively, between times T6 and T8. Meanwhile, between times T6 and T7, sub-section #4 stored in segment #4 is displayed. Then, between times T7 and T8, sub-section #6 is displayed from segment #0. It is noted that at time T7, sub-section #6 is still being reconstructed into segment #0 and is half-way complete when display of segment #0 begins. This does not pose a problem as long as the reconstruction of a segment leads display by slightly more than half the segment, so that reconstruction of the segment is completed before display of that same segment is completed. At time T8, the first frame #0 has been completely reconstructed, and the first field of frame #0 has been displayed.

Operation continues in a similar manner for reconstruction of frame #1 during the second iteration #1. It is noted that the time designators T0–T8 will again be used, but in reference to iteration #1. Since segments #4 and #0 were just displayed, they are free at time T0 of iteration #1. Thus, sub-sections #0 and #1 of frame #1 are reconstructed into segments #4 and #0, respectively. Meanwhile, the second field of frame #0 starts being displayed at time T0 of iteration #1. In particular, sub-section #1 stored in segment #1 is displayed between times T0 and T1, and sub-section #3 stored in segment #3 is displayed between times T1 and T2. Segments #1 and #3 are then re-used from time T2 to T4 for storing reconstructed data corresponding to sub-sections #2 and #3. Also, from time T2 to T3, sub-section #5 stored in segment #5 is displayed, and from time T3 to T4, sub-section #7 stored in segment #2 is displayed. At time T4, the entire frame #0 has been displayed and half of frame #1 has been reconstructed. From time T4 to T6, sub-sections #4 and #5 of frame #1 are reconstructed into segments #5 and #2, respectively, while sub-sections #0 and #2 stored in segments #4 and #1, respectively, are consecutively displayed. Segments #4 and #1 are then used between times T6 and T8 to reconstruct the final two sub-sections #6 and #7 of frame #1, while sub-sections #4 and #6 of frame #1 stored in segments #5 and #4, respectively, are consecutively displayed. At time T8 of the second iteration #1, frame #1 has been completely reconstructed and the first field of frame #1 has been displayed.

Operation proceeds in a similar manner for iterations #2–#5. The data from two consecutive segments being displayed during a reconstruction process are freed and preferably used for the next consecutive reconstruction process. Display occurs in an interlaced manner, where the top field including sub-sections #0, #2, #4 and #6 is displayed first followed by the bottom field including sub-sections #1, #3, #5 and #7. Whichever segment contains the appropriate sub-section when required for display is accessed by the display controller, such as the display controller 224, and displayed at the appropriate time. A memory organizational device, such as the segmentor 220 and segment pointer table 222, is used by the display controller 224 or by a memory controller to keep track of data organization for display. FIG. 3 illustrates that only six segments of memory is necessary for storing and displaying a B frame having a size equivalent to eight segments of memory, resulting in 25% of memory savings. This corresponds to a savings of 1,244,160 bits for a PAL frame and 1,036,800 bits for an NTSC frame, assuming 12 bits per pixel.

Appendix A, appended hereto and incorporated herein, includes a segment table I for illustrating operation for PAL type B frames. Each frame is preferably 720 pixels by 576 lines (scan lines) for a total of 414,720 pixels or 4,976,640 bits. The frame size is divided into 36 sections, each section including only one slice of the frame, where each slice equals one macroblock row. The memory, therefore, includes 36 +2=38 segments, each segment labeled #0–#37 and including space for 720-pixels×8-lines=5,760 pixels. Each segment is thus 69,120 bits (assuming 12 bits per pixel). Each section is conceptually divided into 2 sub-sections, for a total of 72 sub-sections labeled #0–#71, which are listed in a display sub-section column on the left side of segment table I. Again, reconstruction occurs in a progressive manner one slice at a time, where data for each slice is reconstructed into two segments at a time. The segment table I in appendix A lists the segment display order corresponding to the sub-sections being displayed for PAL type B frames. In particular, each column in segment table I lists the segments being accessed for each field of each frame. Ten frames are shown, labeled Frm0–Frm9, where each frame includes two fields, labeled Fld0 and Fld1.

Reconstruction begins before display occurs according to segment table 1, where sub-sections #0–#35 are reconstructed into segments #0–#35, respectively. Reconstruction then continues for sub-sections #36 and #37 into segments #36 and #37, respectively, while display of Fld0 of Frm0 begins by displaying segments #0 and #2, as shown at the top of the first segment column of segment table 1, labeled Frm0, Fld0. Then reconstruction is performed for sub-sections #38 and #39 into segments #0 and #2, respectively, while segments #4 and #6 are displayed. Then reconstruction is performed for sub-sections #40 and #41 into segments #4 and #6, respectively, while segments #8 and #10 are displayed. Operation continues in this manner, where one fourth of Frm0 is displayed after sub-section 36 in segment 36 is displayed. Then sub-sections #38 and #40 stored in segments #0 and #4, respectively, are displayed, as listed in the first segment column of segment table I. Again, operation continues in like manner until Fld0 of Frm0 is completely displayed, and then the segments corresponding to Fld1 of Frm0 is displayed. Frm0 completes at the end of the first segment column of segment table I, and then display of Frm1 begins at the top of the second segment column, labeled Frm1, Fld0. Operation proceeds in like manner for the ten frames Frm0–Frm9 provided in segment table I.

Segment table I in Appendix A illustrates that the amount of memory needed to reconstruct and display each B frame need only be just over half the size of the size of the B frame itself. For PAL type B frames, only 2,626,560 bits are required for a B frame size of 4,976,640 bits, resulting in a savings of 2,350,080 bits, so that a memory size of only 0.528 or less than 53% the size of a full frame is required. It is noted that the smallest segment size corresponding to the maximum amount of memory savings is half of a slice, Thus, it is not desired to divide each PAL type frame by more than 36 sections. For example, for NTSC type frames having 30 slices and 4,147,200 bits, the maximum memory savings occurs by dividing each frame by 30 sections. This results in 32 corresponding segments, each segment having 69, 120 bits, for a total memory size of 2,211,840 bits. Thus, the maximum savings for NTSC type frames is 0.533 ti mes a full frame size, which is still about 53% savings. However, memory savings is still achieved by dividing the frames by a smaller number of larger sections.

The following table II illustrates the amount of bit savings for various divisions of frames for both PAL and NTSC type frames:

TABLE II

Memory Savings for Various Divisions of Framestores

| Sections | Segments | Framestores | Iterations | Savings (bits) PAL | Savings (bits) NTSC |
|---|---|---|---|---|---|
| 4 | 6 | 0.750 | 5 | 1244160 | 1,036,800 |
| 6 | 8 | 0.667 | 6 | 1658880 | 1,382,400 |
| 12 | 14 | 0.583 | 18 | 2073600 | 1,728,000 |
| 18 | 20 | 0.555 | 70 | 2211840 | 1,843,200 |

TABLE II-continued

Memory Savings for Various Divisions of Framestores

| Sections | Segments | Framestores | Iterations | Savings (bits) PAL | Savings (bits) NTSC |
| --- | --- | --- | --- | --- | --- |
| 30 (NTSC) | 32 | 0.533 | X | 2322432 | 1,935,360 |
| 36 (PAL) | 38 | 0.528 | 420 | 2350080 | N/A | where "framestores" indicates the size of the memory required relative to the size of the frame, and "iterations" refers to the number of frames reconstructed and/or displayed before the segment pattern repeats. Table II illustrates that greater bit savings occurs for the larger number of smaller segments.

Figure 4:
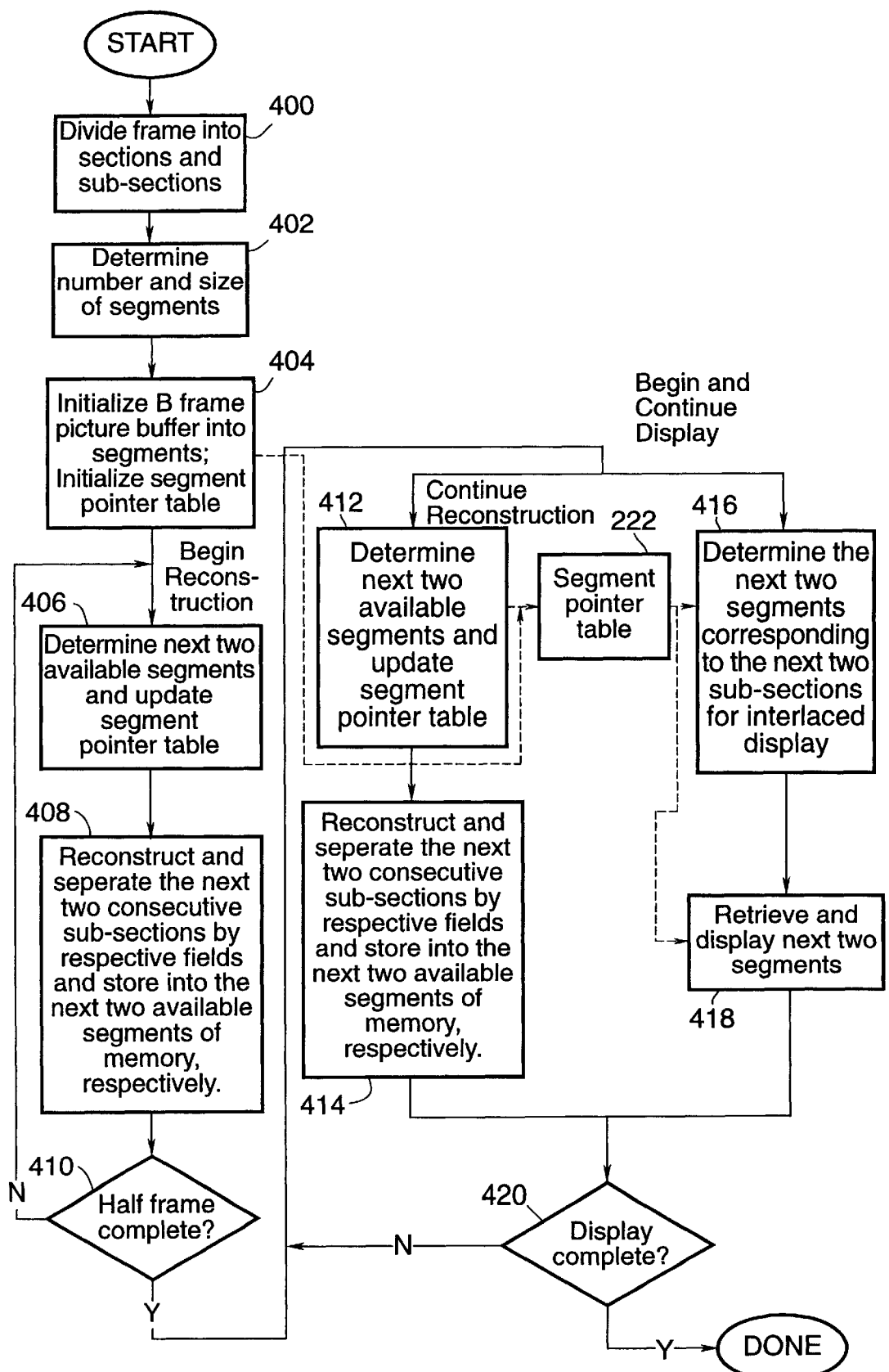
FIG. 4 is a flowchart diagram illustrating operation according to the present invention.

Referring now to FIG. 4, a flowchart diagram is shown illustrating operation according to the present invention. As described previously, a B frame is divided into a number of sections and corresponding sub-sections in step 400, the corresponding number and size of segments is then determined in step 402, and the picture buffer, such as the picture buffer 212, is initialized in step 404. A segment pointer table 222 is preferably included and updated in step 404, where the segment pointer table 222 is a list of pointers to the segments of memory according to the appropriate order of display. The segment pointer table 222 is shown in FIG. 4 and a dashed line between step 404 and the segment pointer table 222 illustrates access and initialization rather than sequence of steps of operation. It is noted that the segment pointer table 222 is not necessarily part of the present method, but if included, may be implemented in any one of many different appropriate manners for tracking the order of the segments for display. The segment pointer table 222, if included, is preferably incorporated into an integrated memory device, such as the memory device 214. The size of the segment pointer table 222 is very small compared to the overall size of the picture buffer 212 and/or the memory device 214 as to be considered negligible. For example, the segment pointer table 222 could include as little as 38 8-bit pointers for a total size of 304 bits. It is further noted that steps 400, 402 and 404 would not necessarily be required for a decoder system tailored for operation according to a particular standard, such as according to PAL, since the frame size and number and size of the segments could be predetermined.

Operation proceeds to step 406, where reconstruction begins by determining the next two available segments of memory and updating the segment pointer table 222. Although the segments could be used in any desired order, the reconstruction order is preferably initially in consecutive order corresponding to progressive reconstruction. In the preferred embodiment, the segment pointer table 222 is in order of display, so that the first entry is to the data from the first field being reconstructed. The pointer to the second segment is preferably inserted just after the half-way point in the segment pointer table 222, since this segment is the first segment of the second field being reconstructed. Operation proceeds to step 408, where the next two progressive sub-sections are reconstructed, separated by respective fields and then stored into the next two available segments determined in step 406. During the reconstruction of each of the macroblocks in the sub-sections in step 408, the data is separated into the first and second fields and stored in the separate segments. Operation proceeds to step 410, where it is determined whether half of the first frame has been reconstructed. If not, operation returns to steps 406 and 408 to reconstruct and separate the next two sub-sections of the first frame.

After half of the first frame has been reconstructed, as determined in step 410, operation proceeds to steps 412 and 416 for continuing reconstruction and beginning display. In step 412, the next two available segments are determined and the segment pointer table 222 is updated in a similar manner as in step 406. In the first pass of step 412, all but two segments have been written to, so the last two available segments are used. From step 412, operation proceeds to step 414, where the next progressive frame section is reconstructed, separated and stored into the next two available segments. Meanwhile, the display operation begins at approximately the same time as indicated by steps 416 and 418. In step 416, the two segments corresponding to the next two sub-sections are determined according to interlaced display, and then displayed consecutively as indicated in step 418. Practically speaking, steps 416 and 418 are preferably executed together for each segment. For example, the next pointer in the segment pointer table 222 is retrieved and the corresponding segment is displayed for each segment. Since reconstruction and display for two segments is performed in about the same amount of time, steps 412 and 414 are completed at about the same time that steps 416 and 418 are completed for every two segments.

From steps 414 and 418, operation proceeds to step 420, where it is determined whether display of one or more consecutive B frames has been completed. If not, operation proceeds back to steps 412 and 416 to continue reconstruction and display, respectively. For the last field of the last B frame in a B frame sequence, however, operation proceeds only back to steps 416 and 418 to complete the display of the final field, where steps 412 and 414 are not performed since reconstruction is complete. Once every one of the one or more consecutive B frames has been displayed, as determined in step 420, operation is completed for that B frame sequence. Thereafter, one or more consecutive I or P frames are displayed. Operation repeats for the next series of B frames encountered in the video sequence.

Figure 5:
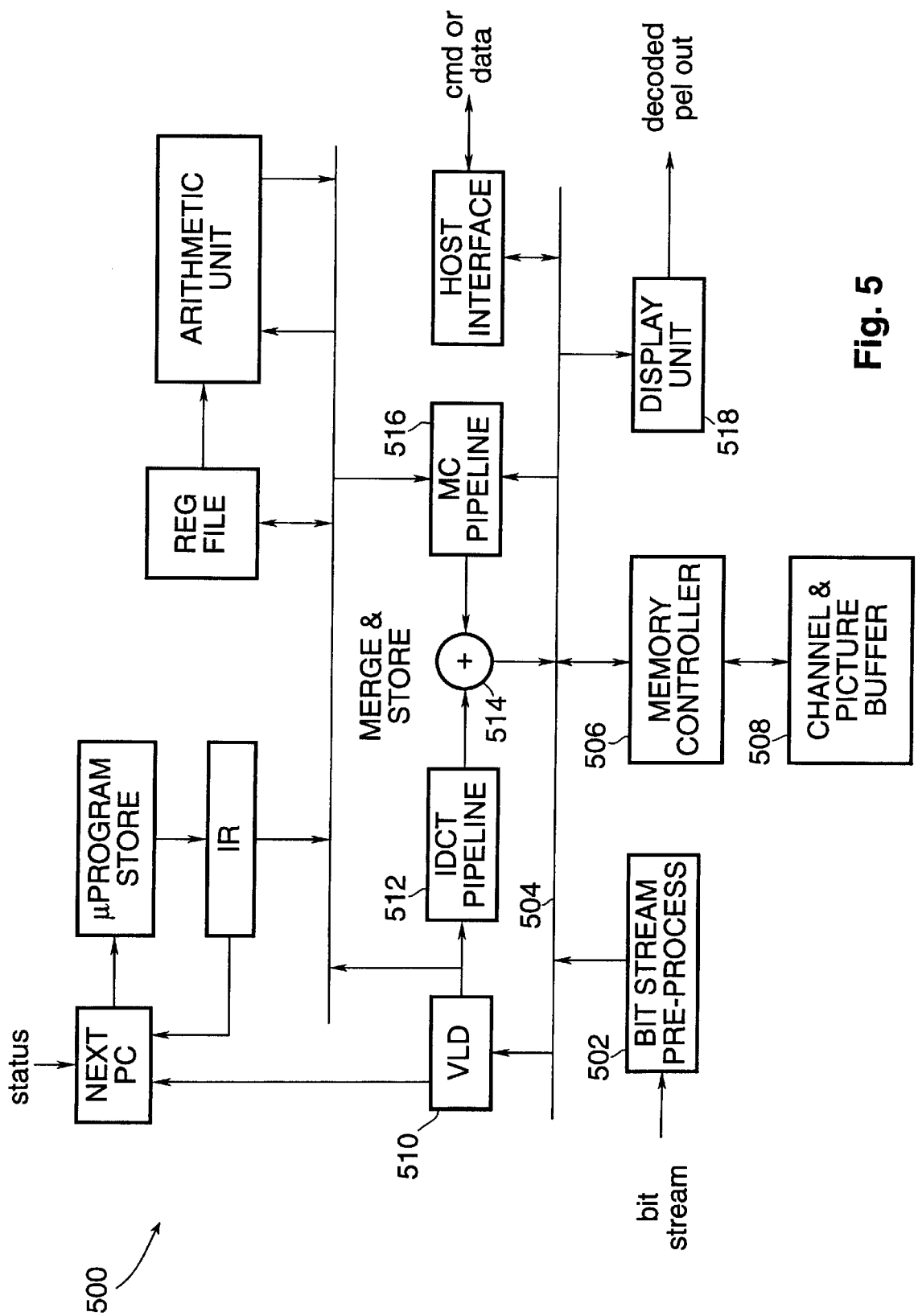
FIG. 5 is a block diagram of another decoder system according to the present invention.

Referring now to FIG. 5, a block diagram is shown of another decoder system 500 according to the present invention. The decoder system 500 is preferably a PAL type MPEG-2 decoder. It is noted, however, that the present invention is not limited to MPEG and may be used for any particular video standard or configuration. A bitstream of video data is received by a bitstream pre-processor 502 coupled to a common memory bus 504, where the pre-processor 502 extracts the encoded video data and provides the data on the bus 504. A memory controller 506 retrieves the data from the bus 504 for temporary storage in a channel buffer portion of a memory device 508. The memory controller 506 is coupled between the bus 504 and the memory device 508 for controlling access to the memory device 508. The memory device 508 is preferably implemented with DRAMs, and preferably includes the channel buffer and a picture buffer for storing pixel data for I, P and B frames.

Video data from the channel buffer is then provided across the bus 504 to a variable length decoder (VLD) 510, which converts the data to DCT data. The data is then provided to an IDCT pipeline 512, which converts the DCT data to macroblocks of pixel data. The macroblocks are provided to a merge and store unit 514 coupled to the bus 504, which provides the data back to the memory device 508. This procedure is followed for I frames. The procedure is similar for P frames, except that the data from the IDCT pipeline 512 is merged with I frame data from a motion compensation (MC) pipeline 516, which retrieves I frame data from the picture buffer in the memory device 508. The procedure is similar for B frames, except that data from both I and/or P anchor frames may be merged together to reconstruct a B frame.

The functions performed by the VLD 510, the IDCT pipeline 512, the MC pipeline 516 and the merger and store unit 514 are collectively referred to as the reconstruction process for reconstruction of frame data. I and P frames are generally stored within the memory device 508 in a standard manner. However, B frames are segmented into the memory device 508 in accordance with the present invention. In particular, the B frame data is separated by field and stored in segments, and the segments are displayed by a display unit 518 coupled to the bus 504. In this manner, the memory device 508 need only include enough memory for just over 2.5 and less than 3 full framestores, depending upon the level of segmentation. The segmentation process may be performed by the merge and store unit 514 and the display unit 518 or by the memory controller 506, or by any particular combination of these devices. The memory controller 506 is a convenient centralized location for storing B frame data into segments and for providing the data in appropriate order to the display unit 518. In the preferred embodiment, however, B frame segmentation according to the present invention is performed by a combination of the merge and store unit 514 and the display unit 518. Thus, the merge and store unit 514 contains circuitry for storing B frame data in the picture buffer of the memory device 508 in segments, and the display unit 518 includes circuitry for retrieving the segments in appropriate order for display.

Figure 6:
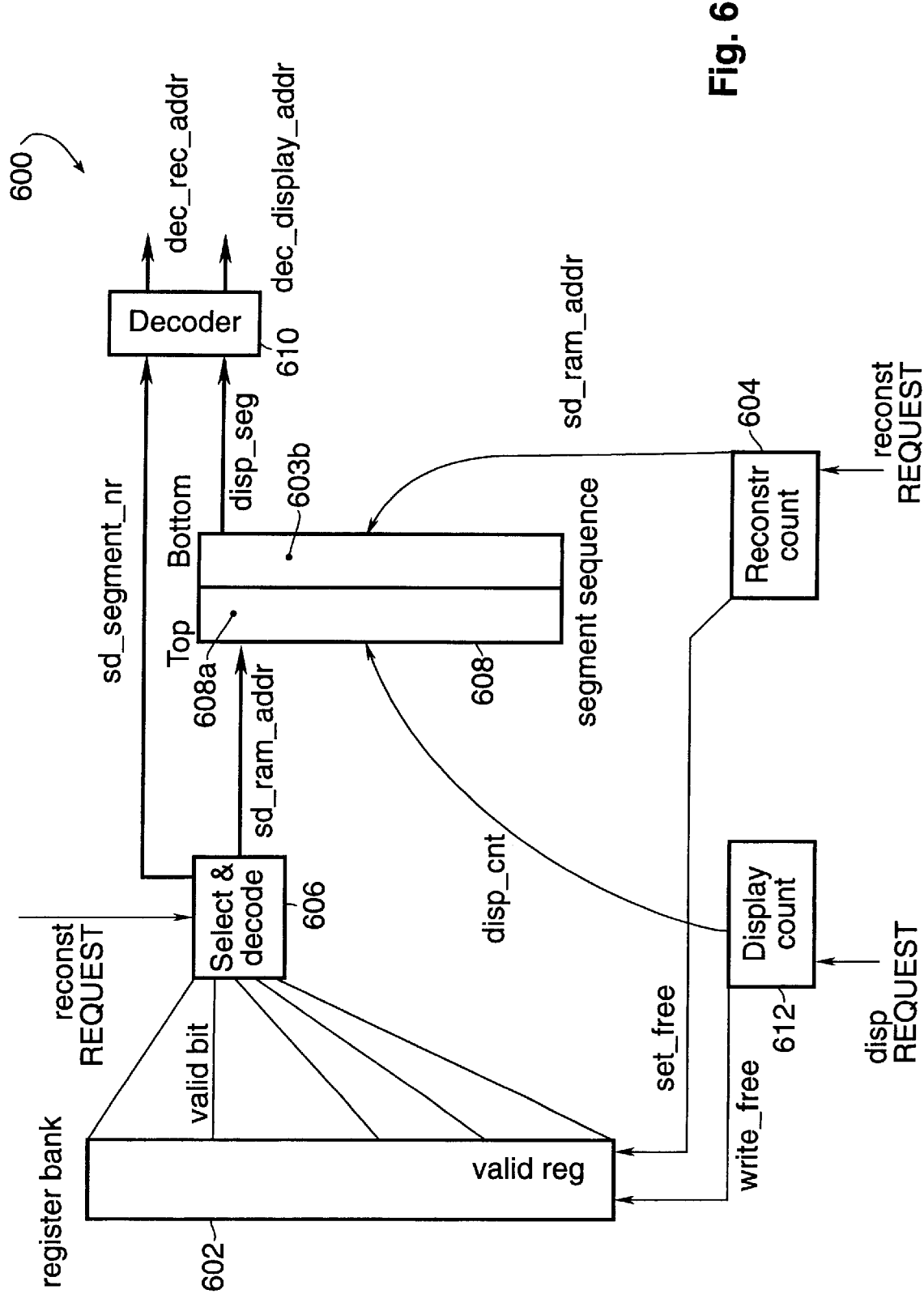
FIG. 6 is a block diagram illustrating dynamic memory allocation performed by the decoder system of FIG. 5.

Referring now to FIG. 6, a block diagram is shown of dynamic memory allocation circuitry 600 according to the present invention, which is incorporated within portions of the decoder system 500. The actual circuitry is preferably distributed in the merge and store unit 514 and the display controller 518. A register bank 602 includes at least one bit for each segment of memory for reconstructing and displaying each B frame. The embodiment shown is preferably for a PAL type MPEG decoder with 36 slices per frame, so that 38 segments, numbered #0–#37, are defined. Thus, the register bank 602 includes at least 38 bits. A reconstruction counter 604 receives reconstruction requests and monitors the bits in the register bank 602 to identify two segments available for reconstruction. Select and decode logic 606 converts the bit locations of the available segments within the register bank 602 to segment numbers between #0–#37. These numbers are then written into a segment sequence memory 608. The corresponding bits in the register bank are "set" by the reconstruction counter 604 to indicate that the associated segments are no longer available for reconstruction until freed by display.

The segment sequence memory 608 includes a top portion 608a and a bottom portion 608b, corresponding to top and bottom fields of each B frame, respectively. In particular, the top portion 608a corresponds to the top field of the frame, and the bottom portion 608b corresponds to the bottom field. Each of the top and bottom portions 608a and 608b includes a plurality of locations for storing segment numbers. The select and decode logic 606 receives the reconstruction request and writes the segment number into the next location of the top portion 608a, corresponding to the segment of memory in the memory device 508 to receive data of the top field during reconstruction, The select and decode logic 606 also writes the segment number into the next location bottom portion 608b corresponding to the segment to receive data of the bottom field. The select and decode logic 606 preferably writes the segment numbers in alternating order between the top and bottom portions 608a and 608b. Thus, during reconstruction of the first two segments, the segment receiving top field data has its number written into the first upper location of the top portion 608a, while the segment receiving the bottom field data has its number written into the first upper location of the bottom portion 608b. An address decoder 610 retrieves the segment numbers from the segment sequence memory 608 and converts each segment number to a physical address of the corresponding segment in the memory device 508. During reconstruction, the merge and store unit 514 uses these addresses to access the appropriate segments for storing reconstructed data.

A display counter 612 receives a display request, monitors the segment sequence memory 608 for the numbers of the next segments to be displayed, and clears the corresponding bits in the register bank 602. The decoder 610 also converts the next two segment numbers from the segment sequence memory to physical addresses of the corresponding segments in the memory device 508 containing the pixel data for display. The display unit 518 uses these addresses to locate the appropriate segments in the memory device 508. The segment numbers retrieved from the segment sequence memory 608 are retrieved in appropriate display order by first retrieving all numbers in consecutive order from the top portion 608a corresponding to the top field, and then continuing and retrieving all numbers in consecutive order from the bottom portion 608b corresponding to the bottom field. Once all of the segment numbers from the bottom portion 608a have been retrieved for display, the segment numbers are once again retrieved from the top portion 608b. In this manner, the segment numbers are written in alternating fashion between the top and bottom portions 608a and 608b on a line by basis during reconstruction, and are accessed in sequential order.

It is now appreciated that a method and apparatus for segmenting memory for decoding and displaying bidirectionally predictive-coded frames according to the present invention substantially reduces the amount of memory required for a video decoder. Since the amount of memory is a major cost item in the production of such decoders, substantial cost savings are achieved. A B frame is conceptually divided into a plurality of sections, each section including one or more macroblock rows of pixel data. Each section includes two sub-sections, where each sub-section corresponds to data from one of the two fields of the frame. The memory for storing and displaying the B frame includes a plurality of segments, where the number of segments equals the number of sections plus two additional segments. The size of each segment is equivalent to a sub-section or half of a section of the frame. Thus, more than half but less than a whole framestore of memory is necessary.

Reconstruction is performed for half the frame prior to display. During reconstruction, the data from each of the macroblocks is separated according to the corresponding fields and stored in separate segments of memory. Thus, each segment of memory receives data from one field or the other during reconstruction. After reconstruction of half of the first frame is completed, display of the segments begins while reconstruction continues. In particular, the last two free segments are written to while the two segments storing data of the top two sub-sections of the first field are displayed. The two segments just displayed are then used for the next consecutive reconstruction of the next frame section. The process continues until reconstruction and then display is completed for each B frames.

The reconstruction process need only determine the two free segments, and the display process need only determine the two segments storing the next two sub-section of data for interfaced display. In the preferred embodiment, a segment pointer table is maintained by the reconstruction process, where the segments are listed in display order. Thus, display devices need only read the pointers from the segment table in consecutive order for identifying the next segment for display. Also, a reconstruction unit need only determine which two segments were last displayed for the next reconstruction.

Since each segment is half the size of the corresponding section of the frame and since only two additional segments are necessary, just over half a framestore of memory is required for B frames. The maximum amount of memory savings is achieved by having each section correspond to a macroblock row, so that each segment is half the size of a slice. For PAL frames having 36 slices, 38 segments are used for resulting in a total memory size of 0.528 times a full framestore. This results in over 2 Mb of memory savings for PAL systems. The present invention enables a decoder system to be implemented using a single integrated memory of 16 Mb or less, thereby substantially reducing overall cost of the decoder system.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

APPENDIX A

Title: Method and Apparatus for Reducing Memory Used for Decoding and Displaying Bidirectionally Predictive-Coded Frames Inventors: David R. Auld and Raymond H. Lim TABLE I: Segment Display Order for PAL Type B Frames

| Display Sub-sections | Display Segments | | | | | | | | | |
|---|---|---|---|---|---|---|---|---|---|---|
| | Frm 0 Fld 0 | Frm 1 Fld 0 | Frm 2 Fld 0 | Frm 3 Fld 0 | Frm 4 Fld 0 | Frm 5 Fld 0 | Frm 6 Fld 0 | Frm 7 Fld 0 | Frm 8 Fld 0 | Frm 9 Fld 0 |
| 0 | 0 | 12 | 21 | 2 | 1 | 28 | 30 | 0 | 12 | 21 |
| 2 | 2 | 1 | 28 | 30 | 0 | 12 | 21 | 2 | 1 | 28 |
| 4 | 4 | 5 | 7 | 11 | 19 | 35 | 4 | 5 | 7 | 11 |
| 6 | 6 | 9 | 15 | 27 | 26 | 22 | 6 | 9 | 15 | 27 |
| 8 | 8 | 13 | 23 | 10 | 17 | 31 | 8 | 13 | 23 | 10 |
| 10 | 10 | 17 | 31 | 8 | 13 | 23 | 10 | 17 | 31 | 8 |
| 12 | 12 | 21 | 2 | 1 | 28 | 30 | 0 | 12 | 21 | 2 |
| 14 | 14 | 25 | 18 | 33 | 24 | 14 | 25 | 18 | 33 | 24 |
| 16 | 16 | 29 | 34 | 32 | 16 | 29 | 34 | 32 | 16 | 29 |
| 18 | 18 | 33 | 24 | 14 | 25 | 18 | 33 | 24 | 14 | 25 |
| 20 | 20 | 37 | 36 | 20 | 37 | 36 | 20 | 37 | 36 | 20 |
| 22 | 22 | 6 | 9 | 15 | 27 | 26 | 22 | 6 | 9 | 15 |
| 24 | 24 | 14 | 25 | 18 | 33 | 24 | 14 | 25 | 18 | 33 |
| 26 | 26 | 22 | 6 | 9 | 15 | 27 | 26 | 22 | 6 | 9 |
| 28 | 28 | 30 | 0 | 12 | 21 | 2 | 1 | 28 | 30 | 0 |
| 30 | 30 | 0 | 12 | 21 | 2 | 1 | 28 | 30 | 0 | 12 |
| 32 | 32 | 16 | 29 | 34 | 32 | 16 | 29 | 34 | 32 | 16 |
| 34 | 34 | 32 | 16 | 29 | 34 | 32 | 16 | 29 | 34 | 32 |
| 36 | 36 | 20 | 37 | 36 | 20 | 37 | 36 | 20 | 37 | 36 |
| 38 | 0 | 12 | 21 | 2 | 1 | 28 | 30 | 0 | 12 | 21 |
| 40 | 4 | 5 | 7 | 11 | 19 | 35 | 4 | 5 | 7 | 11 |
| 42 | 8 | 13 | 23 | 10 | 17 | 31 | 8 | 13 | 23 | 10 |
| 44 | 12 | 21 | 2 | 1 | 28 | 30 | 0 | 12 | 21 | 2 |
| 46 | 16 | 29 | 34 | 32 | 16 | 29 | 34 | 32 | 16 | 29 |
| 48 | 20 | 37 | 36 | 20 | 37 | 36 | 20 | 37 | 36 | 20 |
| 50 | 24 | 14 | 25 | 18 | 33 | 24 | 14 | 25 | 18 | 33 |
| 52 | 28 | 30 | 0 | 12 | 21 | 2 | 1 | 28 | 30 | 0 |
| 54 | 32 | 16 | 29 | 34 | 32 | 16 | 29 | 34 | 32 | 16 |
| 56 | 36 | 20 | 37 | 36 | 20 | 37 | 36 | 20 | 37 | 36 |
| 58 | 4 | 5 | 7 | 11 | 19 | 35 | 4 | 5 | 7 | 11 |
| 60 | 12 | 21 | 2 | 1 | 28 | 30 | 0 | 12 | 21 | 2 |
| 62 | 20 | 37 | 36 | 20 | 37 | 36 | 20 | 37 | 36 | 20 |
| 64 | 28 | 30 | 0 | 12 | 21 | 2 | 1 | 28 | 30 | 0 |
| 66 | 36 | 20 | 37 | 36 | 20 | 37 | 36 | 20 | 37 | 36 |
| 68 | 12 | 21 | 2 | 1 | 28 | 30 | 0 | 12 | 21 | 2 |
| 70 | 28 | 30 | 0 | 12 | 21 | 2 | 1 | 28 | 30 | 0 |
| X | Fld 1 | Fld 1 | Fld 1 | Fld 1 | Fld 1 | Fld 1 | Fld 1 | Fld 1 | Fld 1 | Fld 1 |
| 1 | 1 | 28 | 30 | 0 | 12 | 21 | 2 | 1 | 28 | 30 |
| 3 | 3 | 3 | 3 | 3 | 3 | 3 | 3 | 3 | 3 | 3 |
| 5 | 5 | 7 | 11 | 19 | 35 | 4 | 5 | 7 | 11 | 19 |
| 7 | 7 | 11 | 19 | 35 | 4 | 5 | 7 | 11 | 19 | 35 |
| 9 | 9 | 15 | 27 | 26 | 22 | 6 | 9 | 15 | 27 | 26 |
| 11 | 11 | 19 | 35 | 4 | 5 | 7 | 11 | 19 | 35 | 4 |
| 13 | 13 | 23 | 10 | 17 | 31 | 8 | 13 | 23 | 10 | 17 |

APPENDIX A-continued

Title: Method and Apparatus for Reducing Memory Used for Decoding and
Displaying Bidirectionally Predictive-Coded Frames Inventors: David R. Auld and Raymond H. Lim TABLE I: Segment Display Order for PAL Type B Frames

| 15 | 15 | 27 | 26 | 22 | 6  | 9  | 15 | 27 | 26 | 22 |
|----|----|----|----|----|----|----|----|----|----|----|
| 17 | 17 | 31 | 8  | 13 | 23 | 10 | 17 | 31 | 8  | 13 |
| 19 | 19 | 35 | 4  | 5  | 7  | 11 | 19 | 35 | 4  | 5  |
| 21 | 21 | 2  | 1  | 28 | 30 | 0  | 12 | 21 | 2  | 1  |
| 23 | 23 | 10 | 17 | 31 | 8  | 13 | 23 | 10 | 17 | 31 |
| 25 | 25 | 18 | 33 | 24 | 14 | 25 | 18 | 33 | 24 | 14 |
| 27 | 27 | 26 | 22 | 6  | 9  | 15 | 27 | 26 | 22 | 6  |
| 29 | 29 | 34 | 32 | 16 | 29 | 34 | 32 | 16 | 29 | 34 |
| 31 | 31 | 8  | 13 | 23 | 10 | 17 | 31 | 8  | 13 | 23 |
| 33 | 33 | 24 | 14 | 25 | 18 | 33 | 24 | 14 | 25 | 18 |
| 35 | 35 | 4  | 5  | 7  | 11 | 19 | 35 | 4  | 5  | 7  |
| 37 | 37 | 36 | 20 | 37 | 36 | 20 | 37 | 36 | 20 | 37 |
| 39 | 2  | 1  | 28 | 30 | 0  | 12 | 21 | 2  | 1  | 28 |
| 41 | 6  | 9  | 15 | 27 | 26 | 22 | 6  | 9  | 15 | 27 |
| 43 | 10 | 17 | 31 | 8  | 13 | 23 | 10 | 17 | 31 | 8  |
| 45 | 14 | 25 | 18 | 33 | 24 | 14 | 25 | 18 | 33 | 24 |
| 47 | 18 | 33 | 24 | 14 | 25 | 18 | 33 | 24 | 14 | 25 |
| 49 | 22 | 6  | 9  | 15 | 27 | 26 | 22 | 6  | 9  | 15 |
| 51 | 26 | 22 | 6  | 9  | 15 | 27 | 26 | 22 | 6  | 9  |
| 53 | 30 | 0  | 12 | 21 | 2  | 1  | 28 | 30 | 0  | 12 |
| 55 | 34 | 32 | 16 | 29 | 34 | 32 | 16 | 29 | 34 | 32 |
| 57 | 0  | 12 | 21 | 2  | 1  | 28 | 30 | 0  | 12 | 21 |
| 59 | 8  | 13 | 23 | 10 | 17 | 31 | 8  | 13 | 23 | 10 |
| 61 | 16 | 29 | 34 | 32 | 16 | 29 | 34 | 32 | 16 | 29 |
| 63 | 24 | 14 | 25 | 18 | 33 | 24 | 14 | 25 | 18 | 33 |
| 65 | 32 | 16 | 29 | 34 | 32 | 16 | 29 | 34 | 32 | 16 |
| 67 | 4  | 5  | 7  | 11 | 19 | 35 | 4  | 5  | 7  | 11 |
| 69 | 20 | 37 | 36 | 20 | 37 | 36 | 20 | 37 | 36 | 20 |
| 71 | 36 | 20 | 37 | 36 | 20 | 37 | 36 | 20 | 37 | 36 |

What is claimed is:

1. A memory system for a decoder system for enabling efficient decoding and displaying of bidirectionally predictive-coded (B) frames of pixel data, each B frame comprising a plurality of sections, where each of the plurality of sections includes pixel data corresponding to first and second fields of a frame, the memory system comprising:

a memory including a plurality of segments for storing pixel data, said plurality of segments including one segment for each of the plurality of sections of a frame plus two additional segments, wherein each of said plurality of segments is sized to store half the pixel data of a frame section; and a segmentation device coupled to said memory for receiving and separating said pixel data according to the first and second fields for each section of each frame, wherein said segmentation device tracks said plurality of segments to determine two available segments of said memory, and for each section of each frame, stores pixel data from the first field into a first segment and stores pixel data from the second field into a second segment of the memory, wherein the maximum size of each of said plurality of segments is equal to one-eighth the size of a frame.

2. The memory system of claim 1, wherein said plurality of segments includes a total of six segments.

3. The memory system of claim 1, wherein each B frame comprises a plurality of macroblock rows, and wherein the minimum size of each of said plurality of segments is equal to one-half the size of the amount of memory for storing one macroblock row.

4. The memory system of claim 3, wherein each B frame comprises 720 pixels by 576 lines, and wherein the size of each of said plurality of segments is equal to the size of the amount of memory for storing 720 pixels by 8 lines.

5. The memory system of claim 3, wherein each macroblock of each macroblock row corresponds to a 16 pixel by 16 line portion of a frame.

6. The memory system of claim 5, wherein each macroblock of each macroblock row corresponds to a sampling rate of 4:2:0 for an average of 12 bits per pixel.

7. The memory system of claim 6, wherein said plurality of segments of said memory includes 38 segments.

8. The memory system of claim 7, wherein said memory includes 2,626,560 bits for B frames.

9. The memory system of claim 1, wherein said memory is implemented using dynamic random access memory.

10. The memory system of claim 1, further comprising:

a segment pointer table comprising a list of pointers to said plurality of segments; and wherein said segmentation device maintains said segment pointer table by placing said pointers in an appropriate order for interlaced display of the pixel data.

11. A decoder system for decoding and displaying bidirectionally predictive-coded (B) frames of pixel data, each B frame comprising a plurality of at least four sections, where each of the plurality of sections includes data corresponding to first and second fields of a frame, the decoder system comprising:

a reconstruction unit for receiving and for decoding encoded video data into pixel data;

a memory including a plurality of segments for storing pixel data, said plurality of segments including one segment for each of the plurality of sections of a frame plus two additional segments, wherein each of said plurality of segments is sized to store half the pixel data of a frame section;

a segmentation device coupled to said reconstruction unit and said memory for receiving and separating said pixel data according to the first and second fields for each section of each frame, wherein said segmentation device tracks said plurality of segments to determine two available segments of said memory, and for each section of each frame, stores pixel data from the first field into a first segment and stores pixel data from the second field into a second segment of the memory; and display circuitry coupled to said memory for retrieving pixel data from said plurality of segments of said memory.

12. The decoder system of claim 11, wherein the maximum size of each of said plurality of segments is equal to one-eighth the size of a frame.

13. The decoder system of claim 11, wherein each B frame comprises a plurality of macroblock rows, and wherein the minimum size of each of said plurality of segments is equal to one-half the size of the amount of memory for storing one macroblock row.

14. The decoder system of claim 13, wherein said plurality of segments includes 38 segments.

15. The decoder system of claim 11, wherein said memory further includes two full framestores for storing two anchor frames.

16. The decoder system of claim 15, wherein said reconstruction unit further comprises:

merge and store circuitry for merging said two anchor frames for decoding each B frame.

17. The decoder system of claim 15, wherein said memory is implemented using dynamic random access memory.

18. The decoder system of claim 15, wherein said memory is implemented using a single integrated memory device having a maximum size of 16 megabits.

19. The decoder system of claim 11, wherein said display circuitry begins retrieving pixel data from said plurality of segments of said memory after said memory stores one-half of a decoded B frame.

20. The decoder system of claim 19, wherein said two available segments are determined to be the last two segments retrieved by said display circuitry.

21. The decoder system of claim 11, further comprising:

a segment pointer table comprising a list of pointers to said plurality of segments; and wherein said segmentation device maintains said segment pointer table by placing said pointers in an appropriate order for interlaced display of the pixel data.

22. The decoder system of claim 21, wherein said display device retrieves each of said pointers from said segment pointer table in sequential order for accessing each of said plurality of segments.

23. A method of storing and retrieving pixel data for bidirectionally predictive-coded (B) frames using a memory comprising a plurality of memory segments, each segment having a maximum size of one-eighth the size of a frame, wherein the number of segments is equal to half the number of segments required to store an entire frame plus two extra segments, comprising the steps of:

separating the pixel data according to top and bottom fields of the frame in a progressive order;

storing top field pixel data into one segment and storing bottom field data into another segment until the two segments are full;

repeating said separating and storing steps into two more segments until all of the segments are full;

while repeating said separating and storing steps for the last two available segments, retrieving the top field pixel data from the first two segments storing top field pixel data thereby freeing those segments;

repeating said retrieving step for all of the segments containing top field pixel data and then for all of the segments containing bottom field pixel data according to an interlaced display order for each B frame; and repeating said separating and storing steps using the two segments freed by each iteration of said retrieving step for each B frame.

24. The method of claim 23, wherein each B frame comprises a plurality of macroblock rows of pixel data, and wherein each of the plurality of segments has a minimum size for storing at least one-half of one macroblock row.

25. The method of claim 23, prior to each iteration of said step of separating the pixel data, further comprising the steps of:

receiving a bitstream of encoded video data; and reconstructing the video data into pixel data.

26. The method of claim 23, after each iteration of said retrieving step, further comprising the step of:

displaying the retrieved pixel data.

* * * * *